United States Patent
Buckner

(10) Patent No.: US 10,041,227 B2
(45) Date of Patent: Aug. 7, 2018

(54) STRONGARM DEVICE FOR USE WITH A HYDRO EXCAVATION HOSE

(71) Applicant: VAC-TRON EQUIPMENT, LLC, Okahumpka, FL (US)

(72) Inventor: Don M. Buckner, Okahumpka, FL (US)

(73) Assignee: VAC-TRON EQUIPMENT, LLC, Okahumpka, FL (US)

(*) Notice: Subject to any disclaimer, the term of this patent is extended or adjusted under 35 U.S.C. 154(b) by 0 days.

(21) Appl. No.: 15/191,869

(22) Filed: Jun. 24, 2016

(65) Prior Publication Data
US 2017/0370071 A1 Dec. 28, 2017

(51) Int. Cl.
| | |
|---|---|
| *E02F 3/88* | (2006.01) |
| *F16L 3/12* | (2006.01) |
| *F16L 3/16* | (2006.01) |
| *F16L 3/18* | (2006.01) |
| *E02F 3/90* | (2006.01) |
| *F16L 3/015* | (2006.01) |
| *E21B 7/18* | (2006.01) |
| *E02F 5/00* | (2006.01) |

(52) U.S. Cl.
CPC ............ *E02F 3/905* (2013.01); *E02F 3/8816* (2013.01); *E02F 3/8891* (2013.01); *E21B 7/18* (2013.01); *F16L 3/015* (2013.01); *E02F 5/003* (2013.01)

(58) Field of Classification Search
CPC ....... E02F 3/905; E02F 3/8816; E02F 3/8891; E02F 5/003; E21B 7/18; F16L 3/015

USPC ........................................... 248/58, 59
See application file for complete search history.

(56) References Cited

U.S. PATENT DOCUMENTS

| | | | | | |
|---|---|---|---|---|---|
| 1,209,353 | A | * | 12/1916 | Story | E02F 5/003 37/466 |
| 2,525,372 | A | * | 10/1950 | Riddell | E03F 7/10 239/175 |
| 3,469,601 | A | * | 9/1969 | Harper | F16L 3/015 137/615 |
| 4,068,824 | A | * | 1/1978 | Flynn | B66F 19/00 248/75 |
| 5,408,766 | A | * | 4/1995 | Pobihushchy | E02F 3/905 37/323 |
| 5,779,198 | A | * | 7/1998 | Rutherford | E21F 17/02 248/49 |
| 6,112,439 | A | * | 9/2000 | Rinker | E02F 3/92 37/305 |
| 6,113,039 | A | * | 9/2000 | Riffle | A62C 33/04 222/74 |

(Continued)

*Primary Examiner* — Tara Mayo-Pinnock
(74) *Attorney, Agent, or Firm* — Matthew G. McKinney, Esq.; Allen, Dyer et al.

(57) ABSTRACT

A strongarm device for use with a hydro excavation hose includes a support frame configured to carry hydro excavation equipment, a support post having first and second ends, the first end being secured to the support frame, and a boom having a first end and a second end, where the first end is pivotally connected to the second end of the support post and configured for the second end of the boom to rotate relative thereto. In addition, the strongarm device includes a bracket secured to and suspended from the second end of the boom, and a roller secured to the bracket and configured for the hydro excavation hose to roll back and forth over an upper surface of the roller.

18 Claims, 4 Drawing Sheets

(56) References Cited

U.S. PATENT DOCUMENTS

| | | | |
|---|---|---|---|
| 2002/0117219 A1* | 8/2002 | Anderson | B66C 23/64 137/615 |
| 2003/0121182 A1* | 7/2003 | Jacobsen | E02F 3/8858 37/195 |
| 2005/0210623 A1* | 9/2005 | Buckner | E01H 1/0827 15/340.1 |
| 2013/0340297 A1* | 12/2013 | Buckner | E02F 3/8816 37/304 |

* cited by examiner

STRONGARM DEVICE FOR USE WITH A HYDRO EXCAVATION HOSE

FIELD

The present invention relates to the field of hydro excavation, and, more particularly, to a strongarm device for use with a hydro excavation hose.

BACKGROUND

Portable hydro excavation systems may be used to remove a variety of wet and dry material. Some applications include storm drain clean out, locating underground utilities, cleanup at treatment plants, vacuuming out retention ponds, and cleaning out pipe lines, for example. The hydro excavation systems are typically mounted on a truck or trailer.

The hydro excavation systems use a high pressure water and/or air to dislodge dirt and debris before being vacuumed up using the hydro excavation hose. The hydro excavation hose typically includes a rigid suction wand that a worker grasps in order to direct an open end to vacuum up the debris and water. The other end of the hydro excavation hose is coupled to the vacuum equipment mounted to the truck or trailer. Often times the truck or trailer cannot maneuver close to where the excavation is being performed so that the worker has to drag a length of the hydro excavation hose from the vacuum equipment to the excavation site. The hydro excavation hose is relatively heavy and having a typical diameter of six inches or more.

SUMMARY

In view of the foregoing background, it is therefore an object of the present invention to provide a strongarm device for use with a hydro excavation hose that makes it easier for the worker to maneuver during a hydro excavation operation.

This and other objects, features, and advantages in accordance with the present invention are provided by an embodiment of a strongarm device having a support frame configured to carry hydro excavation equipment, a support post having first and second ends, the first end being secured to the support frame, and a boom having a first end and a second end, where the first end is pivotally connected to the second end of the support post and configured for the second end of the boom to rotate relative thereto. In addition, the strongarm device includes a bracket secured to and suspended from the second end of the boom, and a roller secured to the bracket and configured for the hydro excavation hose to roll back and forth over an upper surface of the roller.

In another embodiment, a strongarm device for use with hydro excavation equipment includes a support frame, the hydro excavation equipment mounted to the support frame, and a hydro excavation hose having first and second ends, where the first end is coupled to the hydro excavation equipment. The hydro excavation equipment also includes a suction wand coupled to the second end of the hydro excavation hose. The strongarm device includes a support post having first and second ends, where the first end is secured to the support frame, and a boom having a first end and a second end, where the first end is pivotally connected to the second end of the support post and configured for the second end of the boom to rotate relative thereto. In addition, the strongarm device includes a roller secured to and suspended from the second end of the boom and having the hydro excavation hose draped over an upper surface of the roller to roll back and forth over the upper surface of the roller. The strongarm device includes a collar coupling the second end of the support post to the first end of the boom and is configured to cause the second end of the boom to rotate to a first direction when the hydro excavation hose is draped over the roller and the hydro excavation hose.

In another embodiment, a strongarm device for use with a hydro excavation hose includes a support frame configured to carry hydro excavation equipment, a boom having a first end and a second end, where the first end is pivotally connected to the support frame and configured for the second end of the boom to rotate relative thereto, and a roller secured to and suspended from the second end of the boom and configured for the hydro excavation hose draped over an upper surface of the roller to roll back and forth over the upper surface of the roller. In addition, the second end of the boom is configured to rotate to a first direction when the hydro excavation hose is draped over the roller and the hydro excavation hose is being pulled in the first direction.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
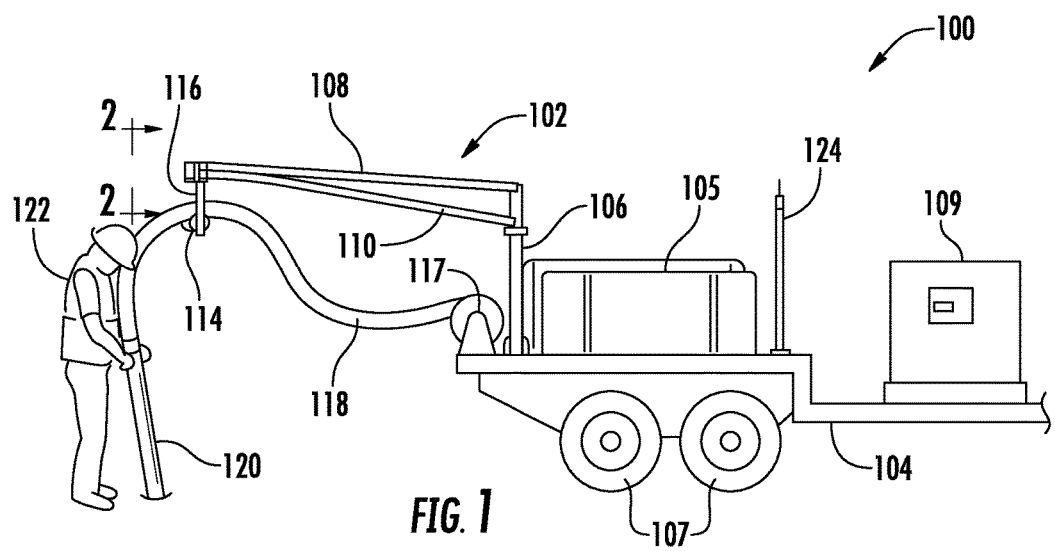
FIG. 1 is a right side elevational view of a strongarm device for use with a hydro excavation hose installed on a trailer in accordance with the invention.

Referring initially to FIG. 1, a strongarm device 100 is shown. A support frame 104 such as a trailer on wheels 107, for example, may be used to mount and carry the strongarm device 102, hydro excavation equipment 105, and related equipment 109. The strongarm device 102 includes a vertical support post 106 having first and second ends. The first end of the support post 106 is a lower end that is secured to the support frame 104. The second end of the support post 106 is an upper end that is used to connect a boom 102.

The boom 102 includes a first end and a second end, where the first end is pivotally connected to the second end of the support post 106 and is configured for the second end of the boom 102 to rotate relative thereto. The boom 102 includes an upper arm 108 and a lower arm 110 vertically spaced apart at the first end of the boom 102 and converge towards the second end of the boom 102.

The strongarm device may include a storage post 124 having first and second ends. The first end of the storage post 124 is secured to the support frame 104 and the storage post 124 is configured to support the second end of the boom 102 when the boom 102 is swung over the support frame 104.

A hose reel 117 may be mounted to the support frame 104 and used to store a hydro excavation hose 118. The hydro excavation hose 118 can be draped over a roller 114 mounted proximate the second end of the boom 102 and attached to a suction wand 120. A worker 122 holds the suction wand 120 and uses it for excavating material. The excavation hose 118 is supported above the worker 120 by the boom 102, which makes the hydro excavation hose 118 easier to maneuver back and forth since the weight is being supported by the boom 102.

Figure 2:
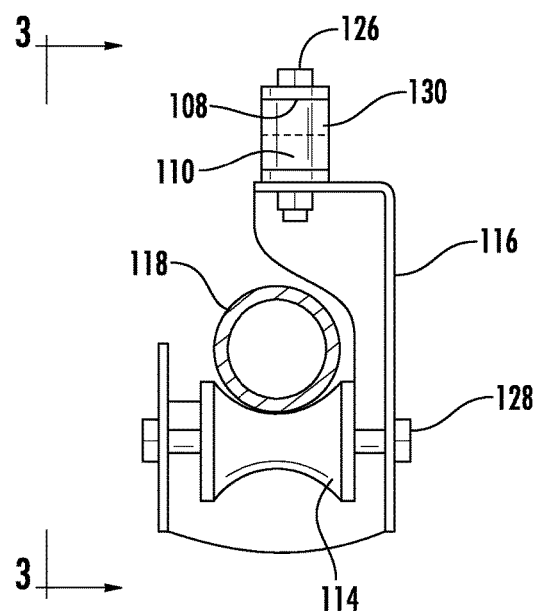
FIG. 2 is front view of a portion of the strongarm device taken in the direction of line 2-2 of FIG. 1.
Figure 3:
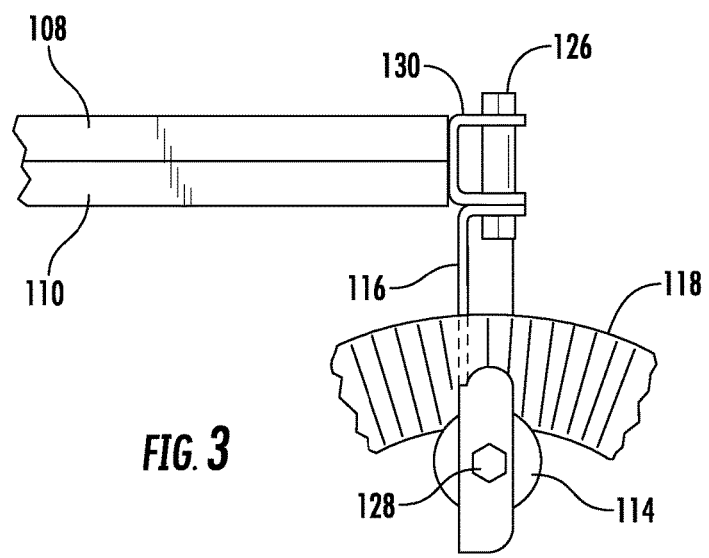
FIG. 3 is side elevational view of the portion of the strongarm taken in the direction of line 3-3 of FIG. 2.

As shown in FIGS. 2 and 3, a C-shaped roller bracket 116 has a top portion spaced apart from a bottom portion and configured for the hydro excavation hose to slide therein is secured to and suspended from the second end of the boom 102 by connector 130 and vertical bolt 126. The C-shaped roller bracket 116 is positioned below the boom 102. A roller 114 is secured to the C-shaped roller bracket 116 by horizontal bolt 128 and configured for the hydro excavation hose 118 to roll back and forth over an upper surface of the roller 114. The roller 114, in a particular embodiment, includes a concave central portion having a diameter similar to the hydro excavation hose 118.

Figure 4:
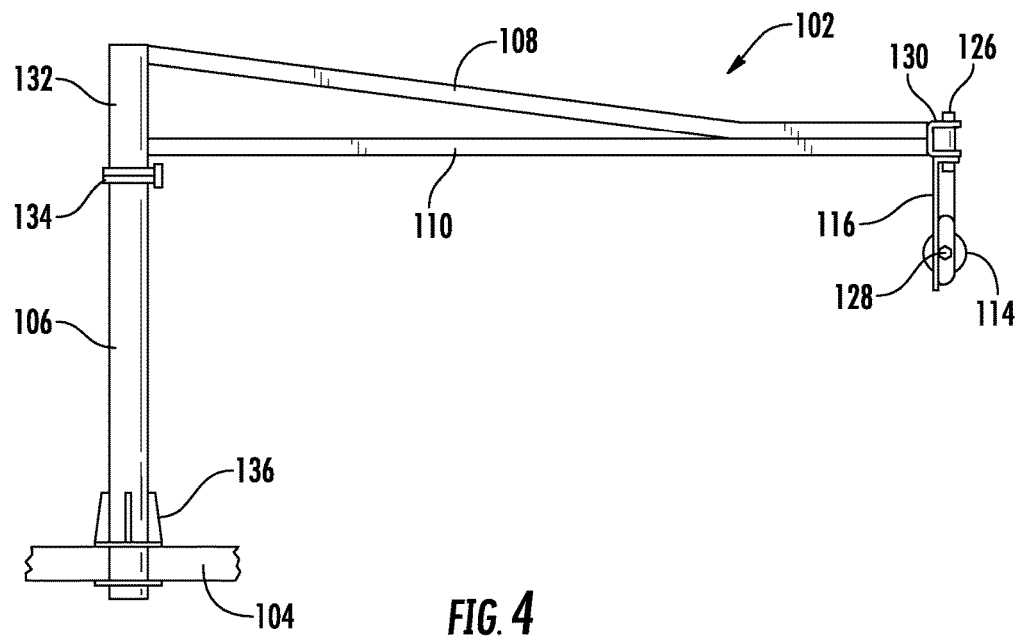
FIG. 4 is a left side elevational view of the strongarm device.
Figure 5:
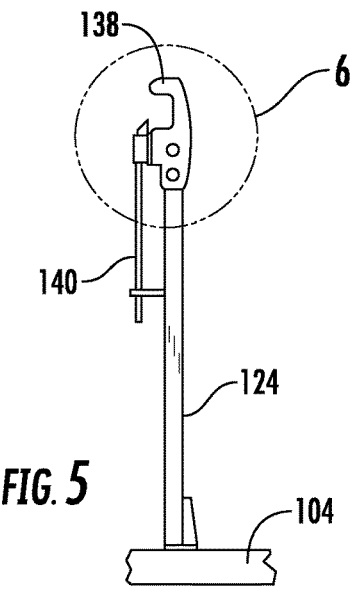
FIG. 5 is a post that may be used to secure the strongarm device in a storage position.
Figure 6:
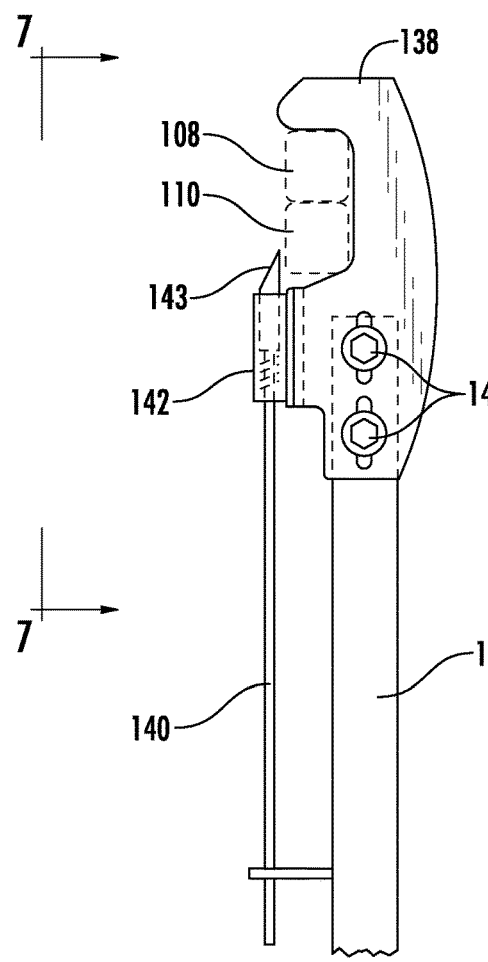
FIG. 6 is a detail view of a top portion of the post of FIG. 5.
Figure 7:
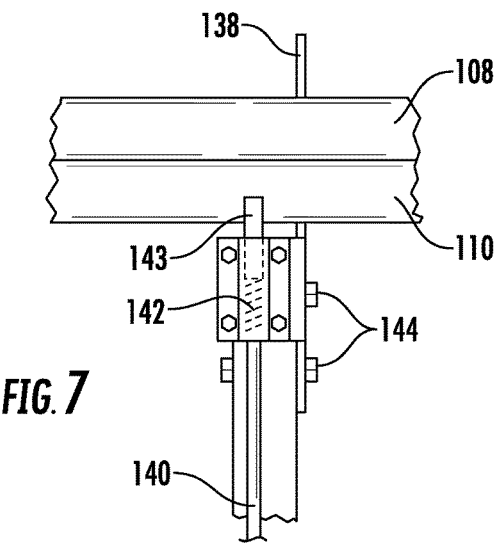
FIG. 7 is a front view of the post taken in the direction of line 7-7 of FIG. 6.
Figure 8:
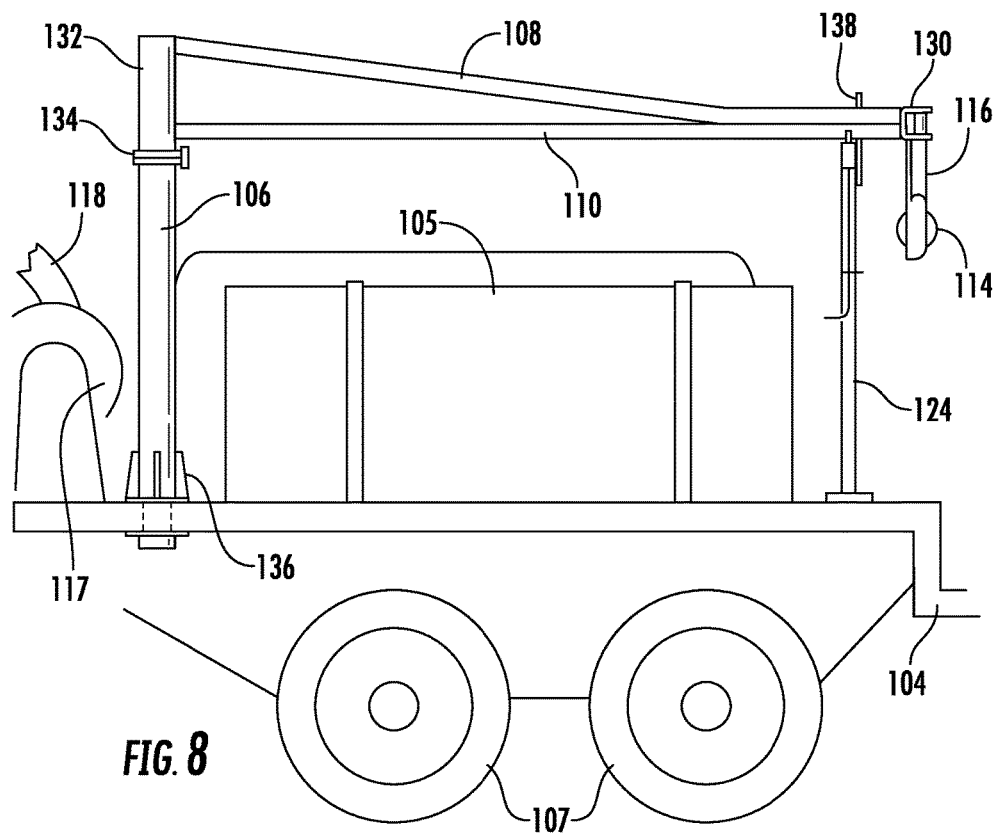
FIG. 8 is a left side elevational view of the strongarm device in a storage position.

Referring now to FIG. 4, the strongarm device 100 includes a collar 134 coupling the second end 132 of the support post 106 to the first end of the boom 102 and configured to cause the second end of the boom 102 to rotate to a first direction when the hydro excavation hose 118 is draped over the roller 114 and the hydro excavation hose 118 is being pulled in the first direction. The first end of the support post 106 may be secured to the support frame 104 using flange 136.

Referring now to FIGS. 5-8, the second end of the storage post 124 may include a C-shaped bracket 138 that is configured to accept the boom 102 therein and secured to the storage post 124 using bolts 144. The storage post 124 is positioned on the support frame 104 so that the C-shaped bracket 138 is spaced inwards from the second end of the boom 102 when the boom 102 is positioned therein. The storage post 124 also includes a spring loaded pin 140 configured to secure the boom 102 within the C-shaped bracket 138. In operation, the spring loaded pin 140 is pulled downward away from the C-shaped bracket 138 so that the second end of the boom 102 can be received therein. The spring loaded pin 140 is then released and a spring 142 forces the spring loaded pin 140 to move upward and biases a tip 143 of the spring loaded pin 140 to remain in that position in order to prevent the second end of the boom 102 from moving out from the C-shaped bracket 138.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A strongarm device for use with a hydro excavation hose comprising:
 a support post having first and second ends;
 a boom having a first end and a second end, the first end being pivotally connected to the second end of the support post and configured for the second end of the boom to rotate relative thereto;
 a C-shaped roller bracket having a top portion spaced apart a distance from a bottom portion and configured for the hydro excavation hose to slide therein, the top portion secured to the second end of the boom and the C-shaped roller bracket positioned below the boom; and
 a roller secured to the bottom portion of the C-shaped roller bracket and configured for the hydro excavation hose to roll back and forth over an upper surface of the roller.

2. The strongarm device of claim 1, further comprising a collar coupling the second end of the support post to the first end of the boom and configured to cause the second end of the boom to rotate to a first direction when the hydro excavation hose is draped over the roller and the hydro excavation hose is being pulled in the first direction.

3. The strongarm device of claim 1, wherein the boom comprises an upper arm and a lower arm vertically spaced apart at the first end of the boom and converge towards the second end of the boom.

4. The strongarm device of claim 1, further comprising a storage post having first and second ends, the storage post configured to support the second end of the boom.

5. The strongarm device of claim 4, wherein the second end of the storage post further comprises a C-shaped bracket configured to accept the boom therein.

6. The strongarm device of claim 5, wherein the storage post is positioned so that the C-shaped bracket is spaced inwards from the second end of the boom when the boom is positioned therein.

7. The strongarm device of claim 6, wherein the storage post further comprises a spring loaded pin configured to secure the boom within the C-shaped bracket.

8. The strongarm device of claim 1, wherein the roller having a concave central portion configured to receive a diameter of the hydro excavation hose.

9. Hydro excavation equipment comprising:
 a support frame;
 a hydro excavation hose having first and second ends;
 a suction wand coupled to the second end of the hydro excavation hose;
 a support post having first and second ends, the first end being secured to the support frame;
 a boom having a first end and a second end, the first end being pivotally connected to the second end of the support post and configured for the second end of the boom to rotate relative thereto;
 a C-shaped roller bracket having a top portion spaced apart a distance from a bottom portion and configured for the hydro excavation hose to slide therein, the top portion secured to the second end of the boom and the C-shaped roller bracket positioned below the boom;
 a roller secured to and suspended from the bottom portion of the C-shaped roller bracket and having the hydro excavation hose draped over an upper surface of the roller to roll back and forth over the upper surface of the roller; and
 a collar coupling the second end of the support post to the first end of the boom and configured to cause the second end of the boom to rotate to a first direction when the hydro excavation hose is draped over the roller and the hydro excavation hose is being pulled in the first direction.

10. The hydro excavation equipment of claim 9, wherein the boom comprises an upper arm and a lower arm vertically spaced apart at the first end of the boom and converge towards the second end of the boom.

11. The hydro excavation equipment of claim 9, further comprising a storage post having first and second ends, the first end secured to the support frame and the storage post configured to support the second end of the boom when the boom is swung over the support frame.

12. The hydro excavation equipment of claim 11, wherein the second end of the storage post further comprises a C-shaped bracket configured to accept the boom therein.

13. The hydro excavation equipment of claim 12, wherein the storage post is positioned on the support frame so that the C-shaped bracket is spaced inwards from the second end of the boom when the boom is positioned therein.

14. The hydro excavation equipment of claim 13, wherein the storage post further comprises a spring loaded pin configured to secure the boom within the C-shaped bracket.

15. The hydro excavation equipment of claim 12, wherein the storage post further comprises height adjustment slots configured to adjust a height of the C-shaped bracket.

16. The hydro excavation equipment of claim 9, wherein the roller having a concave central portion of a diameter of the hydro excavation hose.

17. The hydro excavation equipment of claim 9, comprises a debris tank.

18. The hydro excavation equipment of claim 9, wherein the boom having a height to swing over a top of the hydro excavation equipment.

* * * * *